United States Patent [19]
Lade et al.

[11] Patent Number: 4,949,584
[45] Date of Patent: Aug. 21, 1990

[54] APPARATUS FOR MEASURING DEPTH OF A FLUID CHAMBER

[75] Inventors: Robert W. Lade, Milwaukee; Herman P. Schutten, Bayside; Joseph C. Zuercher, Whitefish Bay, all of Wis.

[73] Assignee: Eaton Corporation, Cleveland, Ohio

[21] Appl. No.: 350,658

[22] Filed: May 8, 1989

[51] Int. Cl.⁵ ............................................. G01B 17/00
[52] U.S. Cl. ..................................... 73/865.8; 73/149; 73/579; 367/129
[58] Field of Search ...................... 73/149, 865.9, 865.8, 73/579; 367/124, 125, 126, 129

[56] References Cited

U.S. PATENT DOCUMENTS

| | | | |
|---|---|---|---|
| 2,666,326 | 1/1954 | Poole et al. | 73/579 X |
| 4,049,077 | 9/1977 | Mifsud | 367/39 X |
| 4,452,074 | 6/1984 | Shelomentsev et al. | 73/660 X |
| 4,492,114 | 1/1985 | Yamanaka et al. | 73/119 A X |
| 4,542,652 | 9/1985 | Reuter et al. | 73/597 |
| 4,599,892 | 7/1986 | Doshi | 73/149 X |
| 4,640,130 | 2/1987 | Sheng et al. | 73/149 X |
| 4,689,553 | 8/1987 | Haddox | 73/149 X |
| 4,704,902 | 11/1987 | Doshi | 73/149 |
| 4,715,226 | 12/1987 | Dorr | 73/149 X |
| 4,811,595 | 3/1989 | Marciniak et al. | 73/149 |

OTHER PUBLICATIONS

Definition of Inertance *Electronics Dictionary*, 4th Ed. John Markus, Consultant, McGraw-Hill Book Co., 1966, p. 317.

*Primary Examiner*—Tom Noland
*Attorney, Agent, or Firm*—C. H. Grace

[57] ABSTRACT

The depth of a cavity or chamber (10') is measured by using the chamber as the resonator of an electronic oscillator (24) whose oscillations are coupled to fluid in the cavity by transducers (12, 13). Both the variable-depth main chamber (10') and a reference chamber (117) of fixed depth are measured. Variations in the data obtained from the chambers are caused by factors affecting the velocity of propagation of sound in the fluid. An accurate measurement of the depth of the main chamber is obtained by compensating direct data (at 42) obtained from the main chamber (10'), using, data (at 43) obtained from the fixed-depth reference chamber (117). In one embodiment an inertance orifice (121) is utilized between the two chambers. The fluid inertance of the orifice, together with the compliance of the fluid in the main chamber (10'), form a resonant system whose anti-resonant frequency is a measure of the dimensions of the main chamber. (Inertance is the acoustical equivalent of inductance.)

8 Claims, 3 Drawing Sheets

FIG. 3
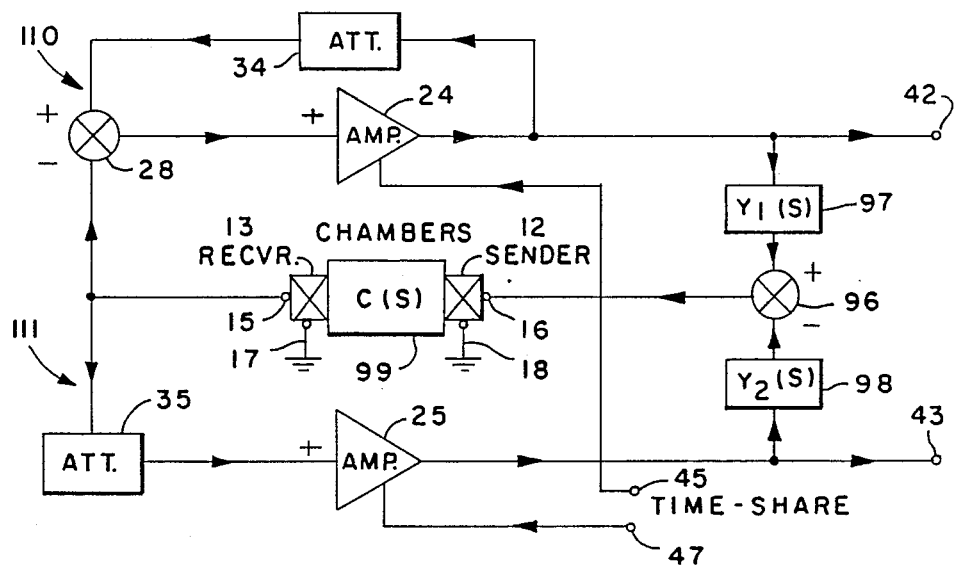
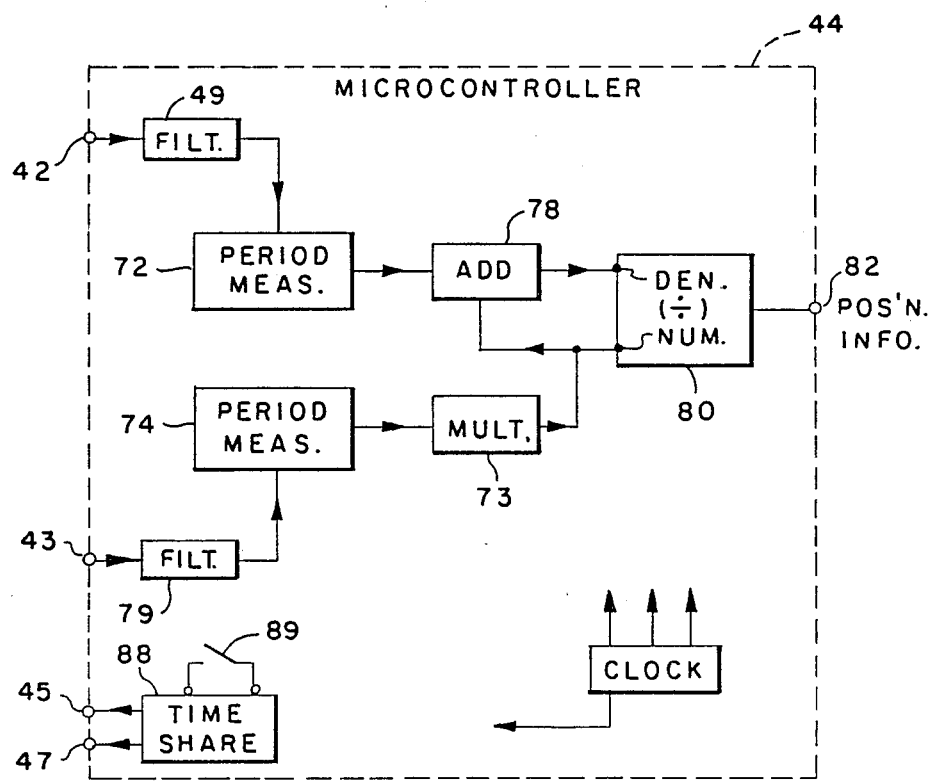
FIG. 4

APPARATUS FOR MEASURING DEPTH OF A FLUID CHAMBER

FIELD

The invention relates to measurement of enclosed cavities using acoustic resonance principles. For example, a cylinder having a piston which is powered in one or both directions by fluid pressure moving the piston, can have the location of the piston measured by sonically measuring the depth of the variable chamber from one end of the cylinder to the piston.

SUMMARY

An object of the invention is to provide a device having a chamber whose depth is to be measured, such as a chamber of an air or oil cylinder, that has one or more transducers for propagating an alternating acoustical pressure signal into the chamber to be measured and receiving signals therefrom. The frequency of the pressure signals is set by oscillations of the chamber and its external circuit, and is therefore set by the dimensions of the chamber itself. Compensation for variations in fluid viscosity, temperature, pressure, etc., are provided by an auxiliary reference chamber of fixed dimensions, which is filled with the same fluid, and is also acoustically measured.

A second object is to provide a chamber and measurement apparatus in which a sender transducer transmits an acoustical wave into a chamber to be measured through an intervening orifice or fluid inertance, and in which the combination of the inertance and the compliance of the fluid in the chamber to be measured form the equivalent of a spring-and-mass mechanical system and thus displays a resonance effect. Inertance is defined as "The acoustical equivalent of inductance." in ELECTRONICS DICTIONARY, by John Markus, Fourth edition, McGraw-Hill Book Co., New York, N.Y.

Another object of the invention is to measure the depth of the main and reference chambers by either or both of resonance and anti-resonance techniques.

BRIEF DESCRIPTION OF FIGURES

FIG. 3 is an electronic circuit having two oscillators for external use with the chambers and transducers of FIG. 1.

FIG. 4 shows certain functions of a microcontroller for use in processing data obtained by the circuit of FIG. 3 and for controlling the measurement process generally.

DETAILED DESCRIPTION

Figure 1:
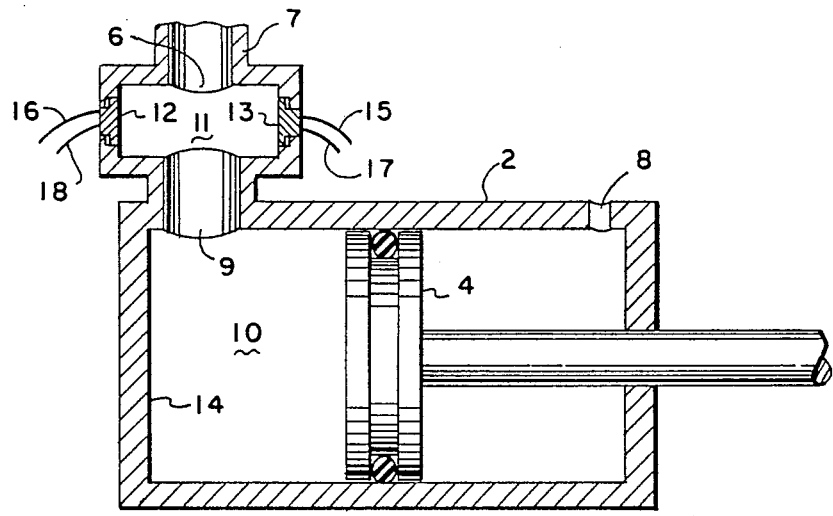
FIG. 1 shows a fluid cylinder (with a piston) that is equipped with a reference chamber having sending and receiving pressure transducers.

As shown in FIG. 1, a main cylinder assembly 2 encloses a movable piston 4 and has fluid ports 6 and 8. The piston 4 and an endcap 14 define a main chamber 10, which is filled with fluid. A reference chamber 11 is fluidly connected with the main chamber 10 through a neck 9. The reference chamber 11 is equipped with a sending transducer 12 whose electrical leads are 16 and 18. Upon being electrically energized, the transducer 12 produces an alternating pressure signal in the fluid. A receiving transducer 13 is mounted on another wall of the reference chamber 11 and has leads 15 and 17.

The transducers are connected to external oscillators such as those of FIG. 3 that are discussed below. The chambers 10 and 11 resonate at different frequencies; the dimensions of the chambers 10 and 11 and control the frequencies at which the chambers and their external oscillators operate. The resonance behavior (anti-resonance or normal resonance) of the chambers depends greatly upon the acoustical design layout, e.g., the positions of the transducers relative to the chambers, the associated inertance, etc. The frequencies involved need not be in the audible range.

Figure 2:
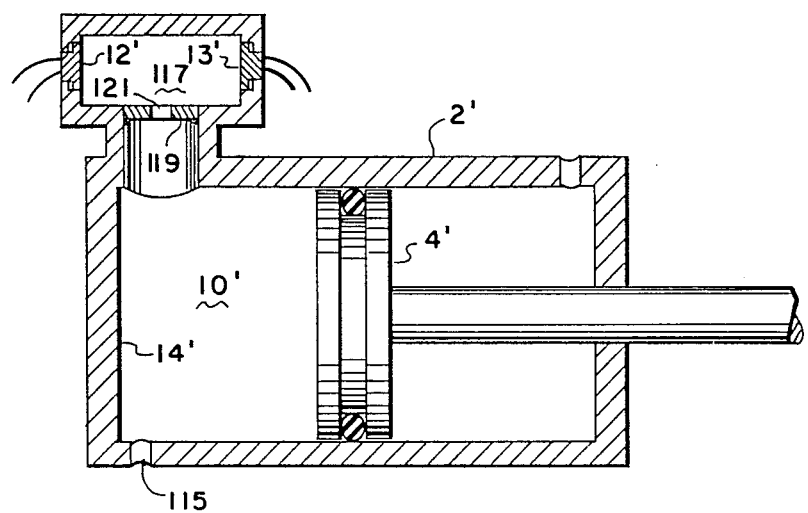
FIG. 2 shows a cylinder and a reference chamber that are separated by a partition having an orifice that serves to increase the fluid inertance between the chambers.

Another design configuration is shown in FIG. 2, where an input-output port 115 to the main chamber 10' is spaced apart from a reference chamber 117. A partition wall 119 having an orifice 121 at its center provides additional hydraulic inertance in the fluid connection between the main chamber 10' and the reference chamber 117. The orifice 121, which has a much greater fluid impedance than the neck 9 of FIG. 1, introduces a large inertance between the chambers.

The fluid in the main volume 10' has a compliance. The combination of inertance 121 and compliance of fluid in the volume 10' form the equivalent of a spring-and-mass mechanical system (or an inductive-and-capacitive electrical system) and thus displays a resonance effect. The acoustical system as a whole is denoted generally by the reference number 99.

In the embodiment of FIG. 2 two transducers 12', 13' are located in the reference chamber 117. Both of them serve to measure both the resonant cavity 117 in which they are mounted and the main cavity 10'. To prevent temperature changes, gas in the hydraulic fluid, and other disruptive factors from introducing errors into measurements of the main chamber 10', the frequency measurements in the reference chamber 117 are utilized to compensate the measurements of the main chamber 10'. Extraneous variables are factored out in this way; the dimensions of the reference chamber 117 are fixed, so that, within a range, its associated resonance does not change very much as a function of piston location.

As shown in FIG. 3, the transducers 12', 13' are connected externally to a two-oscillator, two-frequency electronic circuit having feedback. Oscillations occur (a) at one acoustical resonant frequency dependent upon the orifice 121 and the volume 10', and (b) at another acoustical resonant frequency determined by the dimensions of the reference cavity 117. Both frequencies are also affected by parameters of the fluid, especially those that affect the velocity of propagation of pressure waves in the fluid.

The reference chamber 117 is small enough that its resonant frequency is much greater than that of the volume 10', which is to be measured. In a prototype that was built and tested the ratio of frequency separation is about three to one over most of the piston's range of motion. The resonant frequency of the reference chamber varies little over most of the piston range, but that frequency increases greatly when the piston nears the end point where the reference chamber is located. If desired, this effect can be utilized to obtain a settable end point indication for travel of the piston.

In addition to the frequency separation effect, the resonant behavior of each of the two chambers 117, 10' is different from the other, in a preferred embodiment. The chamber to be measured exhibits an anti-resonant mode whose frequency is believed to be proportional to the square root of piston displacement, while the reference chamber 117 displays a normal resonant mode.

FIG. 3 shows an external electronic circuit for use with the apparatus of FIGS. 1 and 2. The chambers 10' and 117 together have a transfer function C(S), as seen by the sending transducer 12 and the receiving transducer 13. The transfer function C(S) is shown in block 99 of FIG. 3. The compliance of the volume 10' as a whole is affected by the position of the piston in the cylinder, which is the parameter to be measured.

The electronic circuit of FIG. 3 comprises two oscillator circuits, indicated generally as 110 and 111, that share some common components. The oscillator 110 at the top of the figure operates at a frequency determined by the dimensions of the chamber 10', and the oscillator 111 operates at a frequency determined by the dimensions of the chamber 117. An electric wave filter can be included in each loop in specific designs to enhance the frequency selectivity of the two oscillator circuits if desired. The electric wave filters in this embodiment are included in the integrator circuits 97 and 99, having transfer function Y1S) and Y2(S) respectively.

In order to utilize both the anti-resonant and normal resonance features of the system of FIGS. 2 and 3, it is necessary to invert the open-loop response for the former and use the system response normally for the latter. The oscillator 110 includes an amplifier 24 whose output is connected to an attenuator 34 that feeds back positively to an input adder 28, which is connected to the input of amplifier 24. The receiver transducer 13 has one of its leads 17 connected to ground potential and the other lead 15 connected to an inverting input of the adder 28. Thus, the fluid system 99 is in a negative feedback loop.

The output of amplifier 24 is also connected through an integrator and filter 97, which provides a 90° phase shift, to a summing junction 96. The output of junction 96 is connected to the lead 16 of sender transducer 12, whose other lead 18 is connected to ground. Yet another connection of the output of amplifier 24 is to a terminal 42, which represents the output of the oscillator 110, relating to chamber 10. This arrangement of feedback signals results in inversion of the transfer function C(S) so far as oscillator 110 is concerned. Consequently the oscillator 110 seeks and operates at an antiresonant frequency of the chamber 10'.

In a different manner, an amplifier 25 for the reference chamber 117 oscillates through a single feedback path, at a normal resonance frequency (not anti-resonance). The output of amplifier 25 is connected through a 9020 phase shift network and filter (integrator 98) to the summing junction 96, and from there to the sending transducer 12. Its signal traverses the combined transfer function C(S) of the two fluid chambers (99), and is received by the transducer 13. From that transducer it goes through an attenuator 35 to a non-inverting input of the amplifier 25, to sustain oscillations at a resonant frequency of chamber 117. Amplifier 25 also has a connection from its output to a terminal 43, where it provides its oscillating signal to a data processing microcontroller 44 described below.

The amplifiers 24 and 25 can be enabled and disabled selectively by signals at terminals 45, 47 for purposes of time sharing if desired. The microcontroller provides the necessary control signals.

FIG. 4 shows the microcontroller 44 whose interface terminals 42, 43, 45, 47 are the terminals identified above. The functions of the microcontroller 44 are indicated symbolically by blocks, each of which represents a portion of software that performs the function that is labeled in the block. For example, the signal at terminal 42 passes through an electric wave filter 49, and is sent to a period measurement block 72, where its period is measured. This information relates to the main chamber 10'.

Similarly the signal at terminal 43 passes through an electric wave filter 79 and its period is measured in a block 74. The output of block 74 is multiplied by a fixed factor in a multiplier 73, and the output of 73 is input to the numerator terminal of a dividing block 80 of the software. The output of block 73 also connects to one input of an adding block 78, whose other input is received from the period measurement block 72; it is the period measurement data of the signal of terminal 42

The divider 80 divides its numerator input data by its denominator input data, the latter being the sum (of the periods of two signals) that is output from the adder 78. The output terminal of divider 80 is a terminal 82; a final output signal representing the position of the piston 4 is provided there.

Although the simple algorithm just described for utilizing the data from the two chambers is accurate enough for some purposes, it would preferably be utilized only as an indicator that is related to the piston's position. Accurate output data that are calibrated to indicate piston position can be provided by more complicated algorithms, for example by one involving a look-up table and that gives piston position in centimeters.

A portion 88 of the software of microcontroller 44 is utilized to control the amplifiers 24 and 25. In one mode of operation, which is selectable by a mode switch 89, both amplifiers oscillate at the same time. In another mode, time sharing occurs, in which the amplifier 25 is enabled only as frequently as is necessary to maintain accuracy of the final data at terminal 82.

Figure 5:
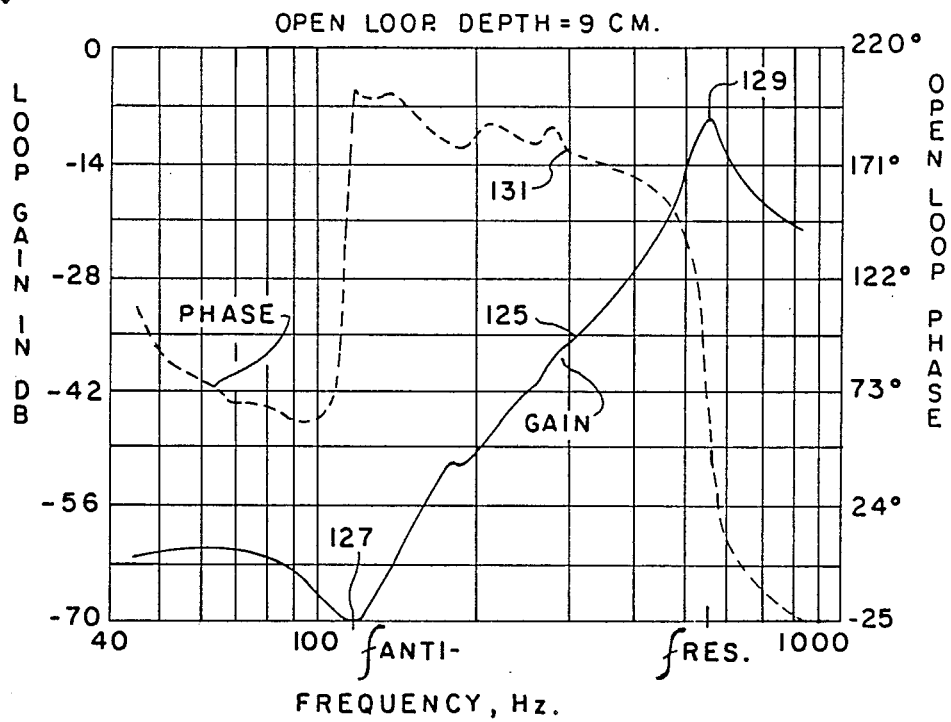
FIG. 5 has two curves showing open-loop resonance and anti-resonance characteristics of the apparatus of FIG. 2.

FIG. 5 shows in curve 125 the open-loop gain of the circuit of FIG. 3 when used with the device of FIG. 2, as a function of frequency. The open-loop gain in decibels is shown on the ordinate scale at the left-hand side of FIG. 5. The abscissa has a logarithmic scale of frequency of oscillation, in hertz. The entire graph corresponds to one particular location of the piston in the cylinder of FIG. 2. An anti-resonant frequency should be noted at a point 127; it is due to the main chamber 10'. A resonant frequency should be noted at a point 129; it is due to the reference chamber 117.

An open-loop phase characteristic of the same apparatus under the same test conditions is shown in a curve 131, which is to be interpreted by reference to the right-hand ordinate scale of FIG. 5. The phase shift (curve 131) is about 90° at both the anti-resonant frequency 127 and at the resonant frequency 129; this is not conducive to stable oscillation at those frequencies. The integrators 97 and 98 of FIG. 3 are included to correct this condition by introducing a phase shift.

Figure 6:
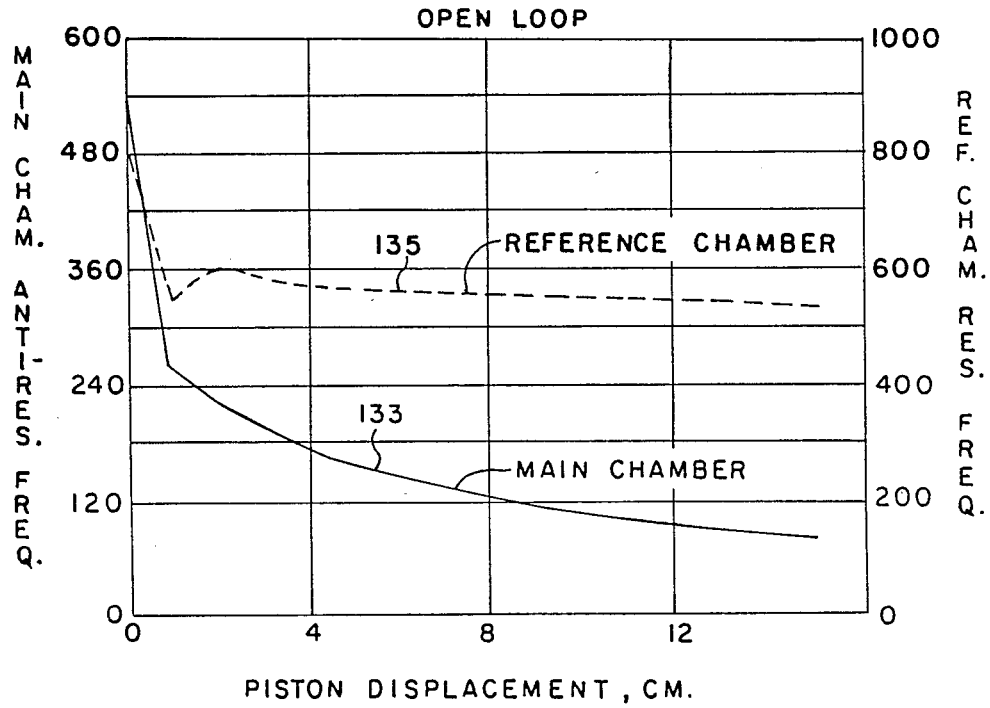
FIG. 6 shows two open-loop curves of characteristic frequencies of the apparatus of FIG. 2 as functions of location of the piston in the cylinder.

FIG. 6 shows the relationship between the piston's location and the two resonant frequencies, i.e., the resonant frequency of the reference chamber 117 (on the right-hand ordinate scale) and the anti-resonant frequency of the main chamber 10' (on the left-hand ordinate scale). Curve 133 is the main chamber curve, and curve 135 is the reference chamber curve. Piston displacement is shown in centimeters on the abscissa, with an extreme leftward position of the piston (FIG. 2) represented by zero.

A few specific embodiments of apparatus utilizing the invention have been described, but many other embodiments are, of course, possible. The scope of the invention is determined by the claims.

We claim:

1. Fluid power apparatus comprising:
   a cylinder (2') having an end surface (14');
   a piston (4') adapted for axial movement in said cylinder and defining a main fluid chamber (10') bounded by the piston and said end surface;
   a reference chamber (117);
   means (121) for fluid communication between said main chamber and said reference chamber;
   transducer means (12, 13) which is vibratable located in at least one of said main and reference chambers coupling vibrations of said transducer means with fluid in said main chamber and said reference chamber;
   amplifier means (24, 25) having positive feedback and connected with said transducer means for interacting with the fluid in said main and reference chambers to provide respective main and reference oscillation signals (at 42, 43), the frequency of each signal being a function of a dimension of the respective chamber;
   information-processing means (44) receiving said main and reference oscillation signals for providing an output signal (at 82) that depends upon the frequencies of both of said oscillation signals and indicative of the location of the piston in the cylinder.

2. Fluid power apparatus as in claim 1 and wherein said transducer means is located in said reference chamber.

3. Fluid power apparatus as in claim 1 and wherein said transducer means comprises (a) sending transducer means for transmitting vibrations into said fluid and (b) receiver transducer means for receiving vibrations from said fluid.

4. Fluid power apparatus as in claim 3 and wherein:
   said amplifier means comprises anti-node means (97, 28, 24) for producing, in at least one of said chambers (10'), resonant standing wave oscillations of such a mode that said receiver transducer means (13) is at an anti-node of the electrical oscillation signal (at 15) respective to said chamber; and
   said anti-node means comprises mode-discriminating means (97, etc) for supporting said mode of oscillation that has an anti-node at said receiver transducer means;
   whereby said apparatus sustains oscillation at a frequency that has an anti-node at said receiver transducer means.

5. Fluid power apparatus as in claim 4 and wherein:
   the chamber that supports oscillation of such a mode that said receiver transducer means is at an anti-node, is said main chamber (10').

6. Fluid power apparatus as in claim 4 and wherein said anti-node means comprises circuit means (97, 96, 99, 28) for inverting the transfer function (C(S)) from said sender transducer to said receiver transducer by connecting said sending transducer with the output of said amplifier means (24) and connecting said receiving transducer with an inverting input of said amplifier means.

7. Fluid power apparatus as in claim 1 and wherein said amplifier means comprises phase shift means (97) for shifting the phase of a feedback signal between the amplifier's output and the amplifier's input by substantially 90 electrical degrees.

8. Fluid power apparatus as in claim 1 and wherein said fluid communications means comprises a partition (119) between said main chamber (10') and said reference chamber (117), said partition having an orifice (121) therethrough that serves as a fluid inertance between said main chamber and said reference chamber.

* * * * *